(12) United States Patent
Love

(10) Patent No.: US 9,410,092 B2
(45) Date of Patent: *Aug. 9, 2016

(54) REFINERY DESALTER IMPROVEMENT

(71) Applicant: Phillips 66 Company, Houston, TX (US)

(72) Inventor: Scott D. Love, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/087,699

(22) Filed: Nov. 22, 2013

(65) Prior Publication Data
US 2015/0175905 A1 Jun. 25, 2015

Related U.S. Application Data

(62) Division of application No. 13/188,113, filed on Jul. 21, 2011, now Pat. No. 8,747,658.

(60) Provisional application No. 61/368,103, filed on Jul. 27, 2010.

(51) Int. Cl.
| | |
|---|---|
| *C10G 33/04* | (2006.01) |
| *C10G 53/02* | (2006.01) |
| *B01D 17/02* | (2006.01) |
| *B01D 17/04* | (2006.01) |
| *B01D 21/00* | (2006.01) |
| *B01D 21/26* | (2006.01) |
| *C10G 7/04* | (2006.01) |
| *C10G 31/08* | (2006.01) |
| *C10G 31/10* | (2006.01) |
| *C10G 33/06* | (2006.01) |

(52) U.S. Cl.
CPC ............ *C10G 53/02* (2013.01); *B01D 17/0217* (2013.01); *B01D 17/041* (2013.01); *B01D 21/009* (2013.01); *B01D 21/262* (2013.01); *C10G 7/04* (2013.01); *C10G 31/08* (2013.01); *C10G 31/10* (2013.01); *C10G 33/06* (2013.01); *B01D 2221/04* (2013.01); *C10G 2300/1033* (2013.01); *C10G 2300/805* (2013.01)

(58) Field of Classification Search
CPC . B01D 17/0217; B01D 17/0208; C10G 31/08
USPC ................... 208/188; 210/243, 322; 196/120
See application file for complete search history.

(56) References Cited

U.S. PATENT DOCUMENTS

| | | | | |
|---|---|---|---|---|
| 4,116,790 A | * | 9/1978 | Prestridge | B01D 17/0217 204/563 |
| 4,722,781 A | * | 2/1988 | Swartz | C10G 31/08 208/177 |
| 5,746,908 A | * | 5/1998 | Mitchell | C10G 31/08 208/188 |
| 6,673,238 B2 | * | 1/2004 | Gerhold | C10G 65/08 208/236 |
| 8,747,658 B2 | * | 6/2014 | Love | B01D 17/0217 196/120 |
| 9,023,213 B2 | * | 5/2015 | Sams | B01D 17/042 210/708 |

(Continued)

FOREIGN PATENT DOCUMENTS

WO WO 94/16033 * 7/1994

*Primary Examiner* — Nina Bhat
(74) *Attorney, Agent, or Firm* — Phillips 66 Company

(57) ABSTRACT

The improved methods relate to desalting hydrocarbon feeds using a separator with a stacked disk centrifuge to separate an emulsified oil and water rag layer. This method is effective for desalting heavy, high ionic, and non-traditional crude oils.

7 Claims, 11 Drawing Sheets

(56) References Cited

U.S. PATENT DOCUMENTS

2003/0217971 A1* 11/2003 Varadaraj ............ B01D 17/045
                                                    210/639
2010/0089797 A1*  4/2010 Chakka ............. B01D 17/0208
                                                    208/188

* cited by examiner

REFINERY DESALTER IMPROVEMENT

CROSS-REFERENCE TO RELATED APPLICATIONS

This application is a divisional application which claims benefit under 35 USC §120 to U.S. application Ser. No. 13/188,113 filed Jul. 21, 2011, now U.S. Pat. No. 8,747,658, entitled "REFINERY DESALTER IMPROVEMENT," which claims benefit under 35 USC §119(e) to U.S. Provisional Application Ser. No. 61/368,103 filed Jul. 27, 2010, entitled "REFINERY DESALTER IMPROVEMENT;" both are incorporated herein in their entireties.

STATEMENT REGARDING FEDERALLY SPONSORED RESEARCH

None.

FIELD OF THE INVENTION

This invention relates to improved methods of desalting hydrocarbon feeds using a stacked disk centrifuge to separate an emulsified oil and water rag layer. This method is effective for desalting heavy, high ionic, and non-traditional crude oil sources.

BACKGROUND OF THE INVENTION

Desalting crude oils is a two step process—creating a fine dispersion or emulsion of fresh water and the oil, and then effecting a phase separation of the water from the oil. Smaller water droplets provide more area for mass transfer of ionic contaminants (mostly chloride salts) from the oil into the water than large droplets. In a typical refinery desalter, the dispersion is created by adding water to the raw crude and then passing the mixture through shell and tube heat exchangers and a mix valve. The mix valve typically imposes less than 10 psi (some plants run at up to about 15-18 psi) of pressure drop on the mixture to created a dispersion. The dispersion is then broken and phase separated in a liquid-full large vessel at about 300° F., with residence times of 30 to 40 minutes, and water coalescence is enhanced by chemical demulsifier addition and the imposition of electrostatic fields.

In U.S. Pat. No. 4,415,434, Hargreaves and Hensley describe a multistage process for dedusting and desalting tarsands, shale oils and coals that uses a standard centrifuge to remove dust and solids from an oil-water emulsion. Thacker and Miller describe a similar process in U.S. Pat. No. 4,473,461 for dedusting heavy oil derived from solid hydrocarbon-containing material such as oil shale, coal or tar sand, into purified streams of oil. Goyal, et al., U.S. Pat. No. 5,219,471, use an electrostatic process of blending crude oil with water and desalting chemicals to remove metals and insoluble materials from the crude oil. In Ohsol, et al., U.S. Pat. No. 4,938,876, U.S. Pat. No. 5,882,506 and U.S. Pat. No. 5,948,242, the rag-oil layer, wash water, and fines are mixed to create a single stream from which oil is recovered with a lighter hydrocarbon diluent by demulsification and phase separation. Engel, et al., U.S. Pat. No. 7,612,117, use of a class of acetylenic surfactants to break water and oil emulsions. These processes dissolve, "break" or disrupt emulsions prior to use of centrifugal forces to create separate oil and water phases.

Oil/water separators like air flotation units, dissolved air flotation, the Ohsol separation process, and other separation technologies are well established in the crude oil refining industry. Unfortunately, the industry is averse to changes in technology and new technologies must be well established and proven before implementation. Even with a need for better separation (Nnanna, 2008), developing new technologies is difficult, expensive and very hard to implement and test, especially on a scale comparable to the hundred thousand or more barrels-per-day required for even small refineries.

Standard desalters have worked well historically with the lighter, less viscous crude oils or for separation of solids from crude and shale oil sources, but their performance is challenged by less traditional low-gravity, high viscosity crude oil. Traditional crude oil desalters have poor ionic salt removal as refineries process lower gravity/higher viscosity oils. When working with unconventional oils, pilot scale desalting runs using electrostatic desalters, including electrostatic coalescence technology or electrocoagulation techniques and the Ohsol process for heavy oils were not effective. Because these unconventional crudes generate higher water-in-crude and higher oil-in-water levels than traditional crude oils, improved methods are required to dewater and desalt unconventional and difficult to work with crude oils. What is required is an inexpensive method that can be integrated into current refinery processes for separating crude oil from the desalter rag layer.

BRIEF SUMMARY OF THE DISCLOSURE

The current invention provides a process for separating crude oil from a refinery desalter rag layer by removing a rag layer stream from the desalter, feeding the rag layer stream to a disk stack centrifuge, separating water from crude oil, adding separated crude oil to the crude oil feed stream, and returning separated water to the desalter to improve crude oil separation and desalting. Using the disk stack centrifuge to separate the desalter rag layer into brine and desalted crude oil is an inexpensive way to increase the capacity of conventional desalters, allow refineries to process heavier oils, and improve desalter performance. The rag layer is quickly separated without requiring additional equipment, chemicals, or re-engineering of the refinery process.

In one embodiment, an improved process for separating non-traditional crude oil feedstock is described where:
A) a desalter separator tank is provided that generates three streams, an outgoing oil feedstream, an outgoing aqueous feedstream and an outgoing emulsion or "rag layer" feedstream,
B) the rag layer from the separator tank is removed at a rate that maintains an approximate rag layer height in the separator tank,
C) the rag layer is fed to one or more disk stack centrifuges, to generate a cleaned oil stream and an aqueous stream,
D) the separated aqueous phase is returned to the desalter vessel, and
E) the cleaned oil is discharged to the desalter oil outlet stream.

In another embodiment, a crude oil desalter system is described with an oil and water feedstream comprising a crude oil and water mixture, a separator connected to said feedstream wherein said separator comprises three or more outgoing streams including an outgoing crude oil stream, an outgoing wastewater stream and an outgoing rag layer stream, one or more outgoing rag layer streams connected to a disk stack centrifuge wherein said disk stack centrifuge comprises three or more outgoing streams including an outgoing crude oil stream, an outgoing wastewater stream and an outgoing solids rich stream, one or more outgoing streams comprising a desalted crude oil, and one or more outgoing streams comprising wastewater.

In one embodiment, a process for removing water from crude oil is demonstrated where an oil and water feedstream is provided with a crude oil and water mixture, the oil and water feedstream is fed to a separator with three or more outgoing streams including an outgoing crude oil stream, an outgoing wastewater stream and an outgoing rag layer stream, the outgoing rag layer stream is removed from the separator, the rag layer is centrifuged in a disk stack centrifuge the disk stack centrifuge has three or more outgoing streams including an outgoing crude oil stream, an outgoing wastewater stream and an outgoing solids rich stream, a desalted crude oil stream and a wastewater stream are removed from the stack disk centrifuge.

In yet another embodiment, a crude oil emulsion rag layer is reduced by feeding an oil and water feedstream to a separator with three or more outgoing streams including an outgoing crude oil stream, an outgoing wastewater stream and an outgoing rag layer stream, removing the outgoing rag layer stream from said separator, centrifuging the rag layer in a disk stack centrifuge that has three or more outgoing streams including an outgoing crude oil stream, an outgoing wastewater stream and an outgoing solids rich stream; removing a desalted crude oil stream from the separator and the disk stack centrifuge; and removing a wastewater stream from the separator and the disk stack centrifuge.

Although emulsion breakers and other chemical additives may be added, this method does not require the addition of these or other chemicals prior to centrifugation. The temperature of the crude charge is very important to the efficient operation of the desalter. It is not necessary to rigidly control the temperature at the desalter; however, abrupt changes should be avoided. Dependent upon separator temperature and centrifuge temperature requirements, the crude charge temperature may be modified in a heat exchange, chiller or other methods. In one embodiment the temperature range is approximately 200° F. to 280° F. In another embodiment the crude charge is less than 300° F. Often changing the feedstream temperature is not required. The approximate rag layer height maintained in the separator tank can be a percentage of the total height, a specific distance from the outgoing oil and water streams, or may be determined by the crude oil and wastewater/brine contaminants. In one embodiment rag layer removal rate is increased until the outgoing separator oil and wastewater are clean enough for further processing. In some embodiments the rag layer stream is chilled to below 250° C., 225° C., 200° C., or lower prior to centrifugation. The stacked disk centrifuge can be any stacked disk separator including nozzle separators, self-cleaning disk separators, solid-wall separators, and the like which contain a stack of conical disks either with or without chambers, surface channels, and the like to separate or collect a variety of materials separated using centrifugal forces. In one embodiment a nozzle bowl design disk stack centrifuge is used allowing variable rates of solids removal during the oil and water centrifugation process.

The crude oil emulsion can be kept at refining temperatures ranging from ambient temperature up to 300° F. dependent upon the pressure, contaminants, and source of the feed stream. The crude oil emulsion may by fed through an optional heat exchanger to achieve a desired temperature between approximately 200 and 300° F., or about 200° F., 210° F., 220° F., 230° F., 240° F., 250° F., 260° F., 270° F., 280° F., 290° F., up to about 300° F. Because the temperature need not be rigidly maintained, the temperature may fluctuate by 5° F., 10° F., or more. Rapid changes in temperature should be avoided.

Non-conventional crude oils can be any high salt or heavy crude oil including Athabasca oil sands (crude bitumen), Orinoco oil sands (extra heavy oil), Canadian Extra Heavy Oil (CXHO), Western Canadian Select (WCS), MacKay River Heavy (MRH), oil shales, crude bitumens, extra heavy oils, oilsands, tarsands, sour crudes, and mixtures thereof. Heavy crudes include crude oils with a gravity between 10 and 25° API or 900 to 1000 kg/m$^3$. Bitumens, tarsands, extra heavy crudes, and the like may be upgraded prior to being separated.

Water can be any available water source including tap water, de-ionized (DI) water, recycled water, distilled water, chilled water, heated water, ultra-purified water, salt water, mixtures thereof, or other known water sources. In one embodiment, heated water is added to the crude oil to increase the temperature of the emulsion layer prior to centrifuge separation.

The water drop size distributions in the rag layer is approximately 1 to 30 µm, approximately 5 to 25 µm, approximately 10 to 15 µm, approximately 9 to 14 µm, approximately 7 µm, 8 µm, 9 µm, 10 µm, 11 µm, 12 µm, 13 µm, 14 µm, 15 µm, 17.5 µm, 20 µm, 22.5 µm, 25 µm, 27.5 µm, or approximately 30 µm. Although water drop size distribution can be reported as an approximate µm, it is a distribution about that size with larger and smaller diameter drop sizes present in the sample.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Figure 1:
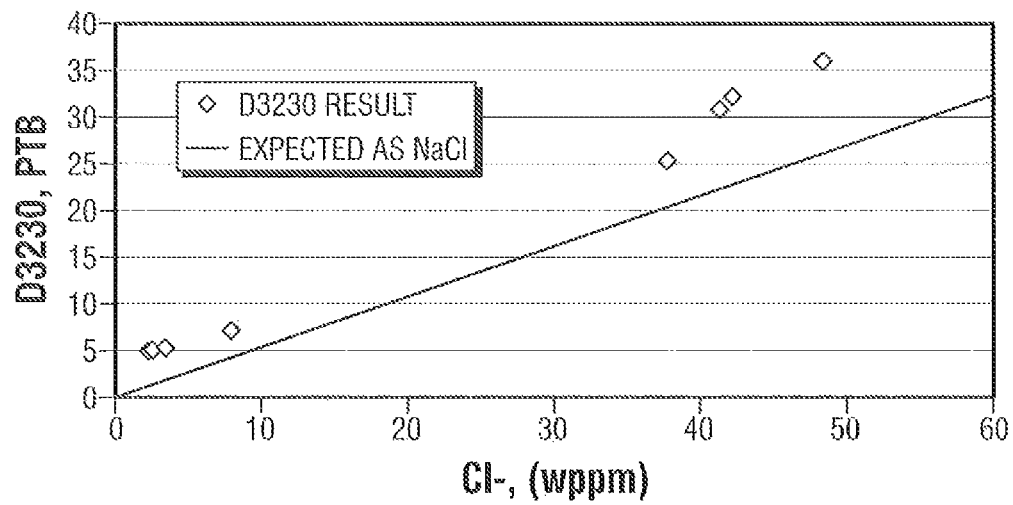
FIGS. 1-8: MRH Salt Content and Particle Size Distribution.

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

When oil and water contact one another for long periods of time, as occurs during the desalting process, an emulsion layer may form between the two liquids. This emulsion layer in the separator vessel may vary in thickness from several inches to several feet. The thickness and composition of the interfacial layer depends on several factors such as 1) naturally occurring emulsifying agents in the crude, 2) waxy constituents of the crude, 3) suspended solids in the crude or process water, 4) the degree of emulsification of the water in the crude, and 5) the processing rate. The emulsion layer may increase to an objectionable thickness in the separator and cause excessive electrical loading, erratic voltage readings, carryover of water and undercarry of oil out of the separator. It is desirable to maintain a constant amount of emulsion in the separator in order to reduce the amount of emulsion and contamination of the outgoing streams. Traditional remedies included adding emulsion breakers, reducing processing rates, and increasing the size of the separator tank. These limited responses are inadequate with the more complicated crude oils being processed today and if higher rates of processing are to be maintained. By controlling rag layer thickness and processing the rag layer through a stacked disk centrifuge, emulsion breaker use is minimized and the footprint of the desalter does not need to dramatically increase. The improved desalter with a separator vessel and stacked disk centrifuge can process the crude oil and brine or water emulsion at a much higher rate and achieve better separation.

Crude oil is generally classified by the geographic location it is produced in (e.g. West Texas Intermediate, Brent, or Oman), by its API gravity, and by its sulfur content. Crude oil may be considered light if it has low density or heavy if it has high density; and it may be referred to as sweet if it contains relatively little sulfur or sour if it contains substantial amounts of sulfur. Oil blends containing bitumen from Athabasca oil sands, Western Canadian Select (WCS), MacKay River Heavy (MRH)), oil from the Orinoco belt in Venezuela (extra heavy oil), Canadian Extra Heavy Oil (CXHO), and the like are considered heavy oils. Unconventional crude oils include shale oils, crude bitumens, extra heavy oils, oilsands, tarsands, sour crudes, and other crudes with a low API, high sulfur content, high water content, high salt content or combinations. Often, unconventional crude oils are treated to reduce contaminants and/or mixed with diluents, water and other chemicals before transportation to meet certain specifications including API and reduced corrosion requirements.

"Water" and/or "Wash Water" as used herein may be de-ionized (DI) water, recycled refinery water, distilled water, chilled water, heated water, ultra-purified water, tap water, clarified water, recirculated wastewater, purified wastewater, or other water source, and combinations of water sources. Salts in water are measured in parts per thousand by weight (ppt) and range from fresh water (<0.5 ppt), brackish water (0.5-30 ppt), saline water (30-50 ppt) to brine (over 50 ppt). In one embodiment, DI water is used to allow salt from the crude oil to diffuse into the aqueous solution, but de-ionized water is not strictly required to desalt a crude oil feedstock. In another embodiment, DI water is mixed with recirculated water from the desalter to achieve a specific ionic content in either the water before emulsification or to achieve a specific ionic strength in the final emulsified product. The water used to scrub the salt, solids, and other impurities from the crude oil may be injected ahead of the preheat exchanger train and/or immediately ahead of a mix valve. Wash water rates may be between approximately 5% and approximately 7% by volume of the total crude charge, but may be much higher or lower dependent upon the crude oil source and quality. Additional wash water sources include sour water stripper bottoms, overhead condensate, boiler feed water, or clarified river water. Frequently, a variety of water sources are mixed as determined by cost requirements, supply, salt content of the water, salt content of the crude, and other factors specific to the desalting conditions, size of the separator, and desalted product required.

"Separator vessel" or "separator tank", also called a separator or coalescer, as used herein describes any number of tanks or vessels that use gravity and electric charge to coalesce and separate oil and water emulsions into a clean oil and wastewater effluent. Separators are available from a variety of commercial and custom sources and include the National Tank Co. (NATCO™), NRG manufacturing, Trivolt, Pall Corp., Primenergy LLC, Hamworthy Technology & Products, and many other sources. Separators include low pressure and high pressure separators, 2 phase separators, electrostatic coalescence separators, AC deep-field electrostatic separator/dehydrator, dual frequency separator vessels, DUAL FREQUENCY® treater (NATCO™), dual polarity combination AC/DC electrostatic separator vessels, the DUAL POLARITY™ treater (NATCO™), Electro-Dynamic® desalter (NATCO™), 3 phase separator (gas, oil and water), High Velocity Electrostatic Coalescing Oil/Water Separator, LUCID™ Separator (Pall Corp.), TRIVOLT™ or TRIVOLT MAX™, Vessel Internal Electrostatic Coalescer (VIEC, Hamworthy) or other available separator manufacturers and suppliers.

"Disk stack centrifuge" as used herein describes any of numerous commercially available separators and centrifuges that separate substances and solids from liquids using a high acceleration field and a stack of conical disks to create a large equivalent clarification area below each of the disks. Stacked disk centrifuges include nozzle separators, self-cleaning disk separators, solid-wall separators, and the like which contain a stack of conical disks either with or without chambers to collect a variety of materials separated using high acceleration fields. The type of separator used depends on the mode of operation, type of crude oil being processed, contaminants in the crude oil, and properties of crude oil emulsion being separated. In one example, a solid-wall stacked disc separator is used during batch processing to remove solids from the emulsion. In another example, crude oils with high levels of solids contamination are run continuously in a stacked disk nozzle separator. In the nozzle separator, solids are discharged through nozzles fitted at the bowl periphery. Ports are spaced evenly around the bowl periphery of the centrifuge. The ports may be fixed as in a conventional stacked disk centrifuge with fixed orifice nozzles, or adjustable ports may be open partially or continuously as required to release solids inside the chamber. Separators with a self-cleaning bowl are able to periodically discharge the separated solids at full speed where a remotely operated ejection system enables both partial and total ejections to be triggered during product separation without stopping or slowing the centrifugal separator. Commercial suppliers of new and used stacked disk centrifuges include GEA Westphalia Separator (Oelde, Germany), Alfa Laval (Lund, Sweden), Mars Tech (New City, N.Y., USA), TEMA Systems (Cincinnati, Ohio, USA), Broadbent (West Yorkshire, United Kingdom), and other suppliers.

ASTM D4006 describes one method to measure water content including soluble water within the oil by distillation. Total water content, water droplet content, water droplet size, and dispersion may be calculated using numerous assays available in the art including visual examination of oil color/haziness, a visual crackle test, a quantitative oil/water analysis, spectroscopic methods, scattering, back-scattering, absorbance, infrared (IR), ultraviolet (UV), elemental determination by laser, quantitative FTIR analysis, and many other standard water and oil quantification techniques including spectroscopic and chemical analysis. Increasing water content in the oil or increasing oil in the water is indicative of a processing rate that exceeds the rate of oil and water separation in the separator. This occurs as the rag layer expands to the clean oil and/or water feed outlets causing increasing contamination of the separated products.

Water DSD measurements were performed using a crude oil/solvent system in a Malvern Mastersizer 2000 instrument using a laser source in a water-saturated toluene dilution. Araujo (2008) and Kraiwattanawong (2009) provide additional guidance on the factors that influence measurements in Malvern Mastersizers. The cutoff diameter (d(0.1) or d(0.5)) was chosen as the geometric mean of the upper and lower values of the largest diameter ranges wherein droplets were detected where either 10 percent or 50 percent of the droplets have a smaller diameter than the size given. Thus for a d(0.1) of 10 μm, 90 percent of the water droplets are larger than 10 μm and 10 percent of the water droplets are less than 10 μm. For water droplet distribution of d(0.5) of 10 μm, ½ of the droplets would be larger than 10 μm and ½ of the droplets would be smaller than 10 μm.

The following experiments demonstrate various embodiments of the invention. Each example is provided by way of explanation of the invention, one of many embodiments of the invention, and the following examples should not be read to limit, or define, the scope of the invention. The objective of the experiments was to demonstrate the ability of a disk stack centrifuge to resolve oil in water dispersions with very small water drop size distributions.

Experiment 1

Small Scale MacKay River Heavy Crude Oil Process

Initial assays were conducted on a small scale to demonstrate the concept and effectiveness of using stacked disk centrifuge to separate large volumes of crude oil rag layer for distillation and further processing. Approximately four drums of a MacKay River Heavy (MRH) crude oil blend with a gravity of 19.9° API were obtained from the Athabasca Terminal in Alberta, Canada and desalted using the stacked disk centrifuge system.

MRH was processed in a blend tank with a water/brine solution through an emulsion pump to replicate a rag layer emulsion as found in separator rag layers. MRH was fed to the blend tank with a water/brine from the water tank, the blended crude oil went through an emulsion pump. An emulsion pump exit line branching to a blend tank return line and a feed line, were fed into a stacked disk centrifuge desalting system with the feed line going through an optional steam driven heat exchanger to control temperature in the separation tank and/or a stacked disk centrifuge. The mixed oil and water emulsion was fed to the small scale stacked disk centrifuge at a constant temperature to ensure that good rag layer separation occurred at temperatures close to commercial plant temperatures. For one or more of the runs, a GEA Westfalia Separator stacked disk centrifuge was used to separate water and oil from an emulsified mixture. Other stacked disk centrifuges, available commercially, may be substituted or used in series to further separate water from the crude oil emulsion. Two lines exited the stacked disk centrifuge: the first waste water line goes to a waste water storage tank and/or a waste water purification system; and the second oil feedstock goes to a storage tank and/or refinery feed for further processing. In some embodiments the waste water is fed directly into the separator tank to maintain separator tank volume and flow rate. A return line may be used to return any rag layer and/or higher water emulsions obtained to the separator tank, blend tank or other point for additional emulsion and/or centrifugation and for further separation.

In this example, approximately 200 gallons of MRH crude oil in the blend tank (plus about 30 gallons of line fill) were mixed with 22 gallons of deionized water through the an emulsion pump system [UNIT 12]. The 19.9° API MacKay River Heavy oil sample [37559-16-1] were blended and emulsified in the blend tank to create a uniform 'rag layer' emulsion. Water was added for about 8 minutes, and the blend tank mixture continued to roll through a ten-stage downhole high-shear centrifugal pump for an additional 10 minutes before the pump was shut down and the normal roll pump was started (a single stage centrifugal pump). The blend tank was cooled before, during, and after the emulsion was formed by tap water flowing through the blend tank jacket. This blended emulsion represented a 'rag layer' that may be obtained from a separator tank during standard desalting operations. Temperature of the oil and the final emulsion was about 100° F. The centrifuge was preheated with deionized water fed through a steam heat exchanger to approximately 200° F., when feed from the blend tank was started at about 3 gpm. No demulsifier or other breaking chemicals were added to the emulsified feed prior to centrifugation. Feed and product flow indicators gave erratic readings throughout the test, so flow was determined by change in blend tank volume versus time. Four sets of samples at various stages, including a feed sample (1-qt), product sample (1-qt), water outlet (4 oz.), chilled feed sample (2 oz) and chilled product sample (2 oz) for water DSD analysis were taken during the approximately 1 hour 30 minutes of run time. Feed was held at an essentially constant pressure and rate, and four feed temperatures were targeted for testing as shown in Table 1, approximately 190° F. (187-194° F.), approximately 200° F. (198-230° F.), approximately 180° F. (170-205° F.), approximately 210° F. (197.5-213° F.), approximately 170° F. (158.5-206° F.) all cooler than conventional desalter temperatures.

Although salt in the oil out samples appears high, the chloride numbers do not support those results. We have seen similar discrepancies between chloride assays ASTM D3230 and D6470 in previous Canadian oils, and the chloride number is considered much more accurate and indicative of desalter performance. A chloride content of 3 wppm should correspond to 1.6 PTB (assuming all NaCl) for this oil, not 5 PTB as shown in Table 1. FIG. 1 is a plot showing the D3230 results against the expected results based on D6470 results. The feed emulsion appeared to be stable during the course of the run, chiefly by examination of the water d(0.5) of the oil in samples. D(0.5) is defined as the droplet diameter at which half of the water volume is in larger droplets (and half is in smaller droplets). For a normal distribution, this would be very close to the peak of the monotonic curve of volume percent versus droplet diameter.

Four crude oil samples were desalted, two drums from the original 12-drum sample and two drums blended from the 10 remaining drums. The remaining eight blended drums and three desalted drums were stored for future use. Salt measured by ASTM D3230 gave an artificially high result compared to the chloride content measured by ASTM D6470. This was also observed during other recent assays with non-conventional crude oils.

no evidence of solids sticking to the disks. In a commercial installation, solids will be discharged from the periphery of the bowl through open nozzles.

Water separated from the feed emulsion was collected during the last few minutes of the run. After three minutes, 5.66 pounds of water were collected. Assuming a density of water at 180° F. of 8.1 pounds per gallon, and the difference in water content from the last set of samples collected (samples 1-7 and 1-8), the feed flow rate would have been approximately 2.4 gpm. If we assumed 3 gpm (as measured by blend tank

TABLE 1

| | | | | | | | | | | | |
|---|---|---|---|---|---|---|---|---|---|---|---|
| MRH Summary of Temperature, water, salt, and particle size | | | | | | | | | | | |
| Batch (Sample) | Ave Temp | Low Temp | High Temp | Water (D4006, vol %) | Salt (D3230, PTB) | Cl⁻ (6470, wppm) | Water (d(0.5), μ) | Ca | Mg | Na | Cl |
| Oil in [17-4](1-1) | 193.1 | 193 | 194 | 10.1 | 35.9 | 48.3 | 14.5 | | | | |
| Oil out [17-2] (1-2) | 187.5 | 187 | 188 | 0.55 | 5.3 | 3.39 | 1.5 | 7.15 | <0.019 | 3.01 | 3.39 |
| Water out [17-5] | n/a | n/a | n/a | | | | | 4.44 | 0.968 | 268 | 339 |
| Oil in [17-9] (1-3) | 223.7 | 215 | 230 | 10 | 32.1 | 42.1 | 13.5 | | | | |
| Oil out [17-7] (1-4) | 202.4 | 198 | 207 | 0.25 | 4.8 | 2.22 | 1.5 | 7.65 | <0.014 | 1.69 | 2.22 |
| Water out [17-10] | n/a | n/a | n/a | | | | | 4.9 | 0.824 | 243 | 322 |
| Oil in [17-14] (1-5) | 182.7 | 152 | 205 | 10.6 | 30.7 | 41.2 | 15.3 | | | | |
| Oil out [17-12] (1-6) | 181.7 | 169 | 189 | 0.575 | 5.1 | 3.46 | n/a | 9.91 | <0.017 | 3.09 | 3.46 |
| Water out [17-15] | n/a | n/a | n/a | | | | | 5.08 | 1.01 | 241 | 319 |
| Oil in [17-19] (1-7) | 185.5 | 185 | 186 | 10.2 | 25.4 | 37.6 | 17.2 | | | | |
| Oil out [17-17] (1-8) | 181.7 | 182 | 182 | 0.55 | 4.9 | 2.51 | 1.5 | 12.3 | 0.016 | 1.98 | 2.51 |
| Water out [17-20] | n/a | n/a | n/a | | | | | 4.61 | 0.949 | 223 | 317 |
| Combined (1-2, 1-4, 1-6 and 1-8) | n/a | n/a | n/a | 0.5 | 7.1 | 7.86 | 2 | | | | |
| Oil in [19-2] (2-1) | 209.9 | 207 | 213 | 1.8 | 9.3 | 12.1 | 4 | | | | |
| Oil out [19-4] (2-2) | 197.5 | 195 | 199 | 0.3 | 5 | 3.35 | n/a | 8.85 | <0.011 | 2.59 | 3.35 |
| Water out [19-5] | n/a | n/a | n/a | | | | | 5.51 | 0.674 | 227 | 284 |
| Combined [19-8] (batch 1&2) | n/a | n/a | n/a | 0.3 | 5 | 3.75 | 2.2 | | | | |
| AVERAGE OIL IN | 198.980 | 190.400 | 205.600 | 8.540 | 26.680 | 36.260 | 12.900 | | | | |
| AVERAGE OIL OUT | 158.467 | 155.167 | 160.833 | 0.371 | 4.183 | 2.488 | 1.125 | 9.172 | 0.015 | 2.472 | 2.986 |
| WATER AVERAGE | n/a | n/a | n/a | | | | | 4.908 | 0.885 | 240.4 | 316.2 |

Figure 2:
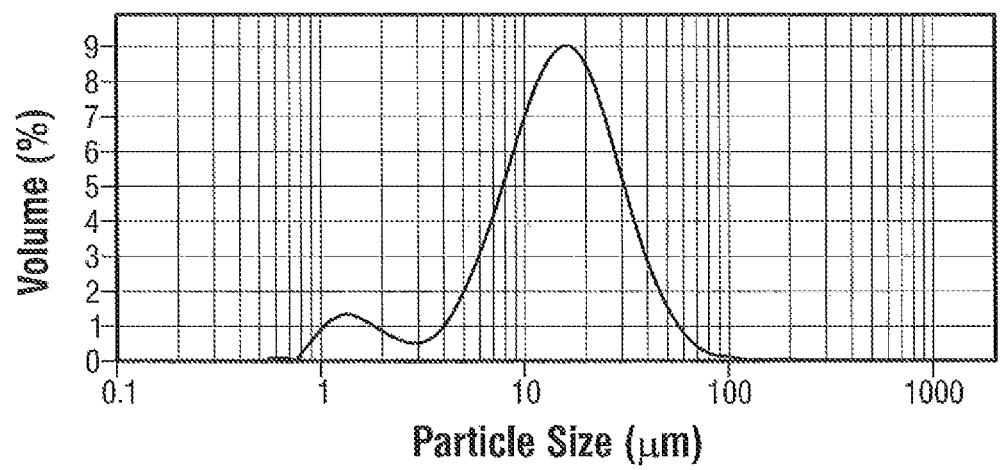
Figure 3:
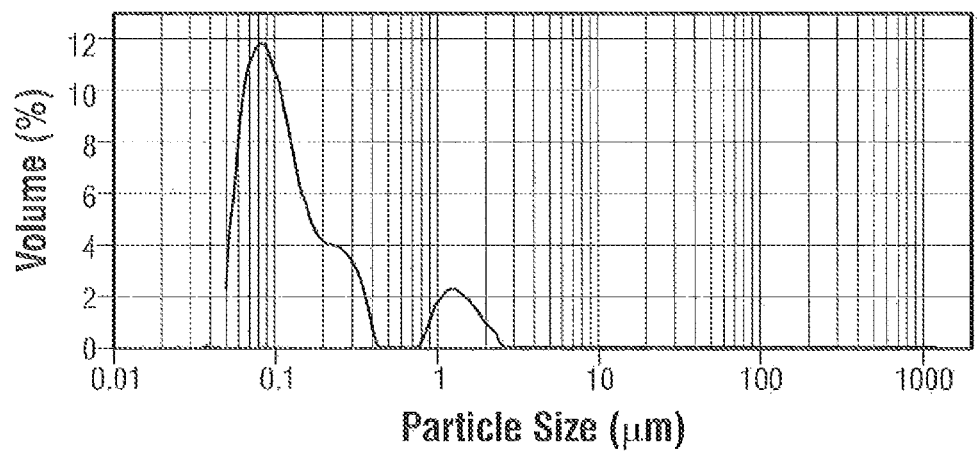
Figure 4:
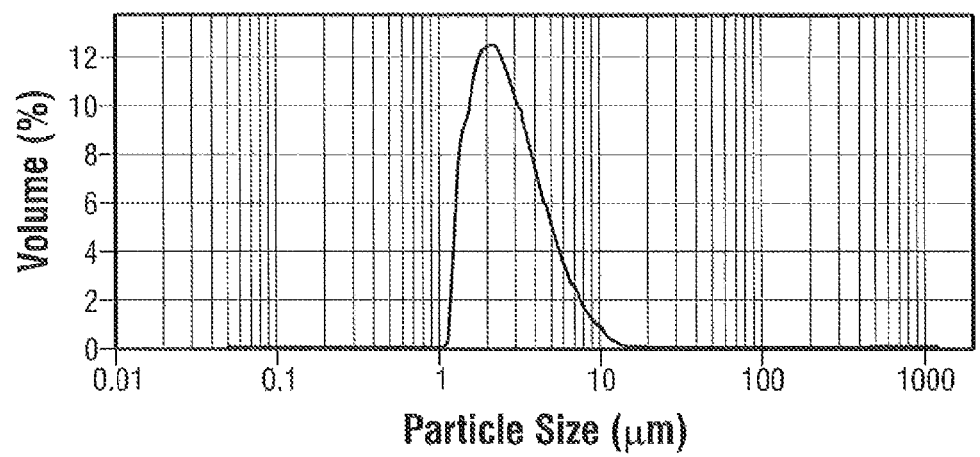
Figure 5:
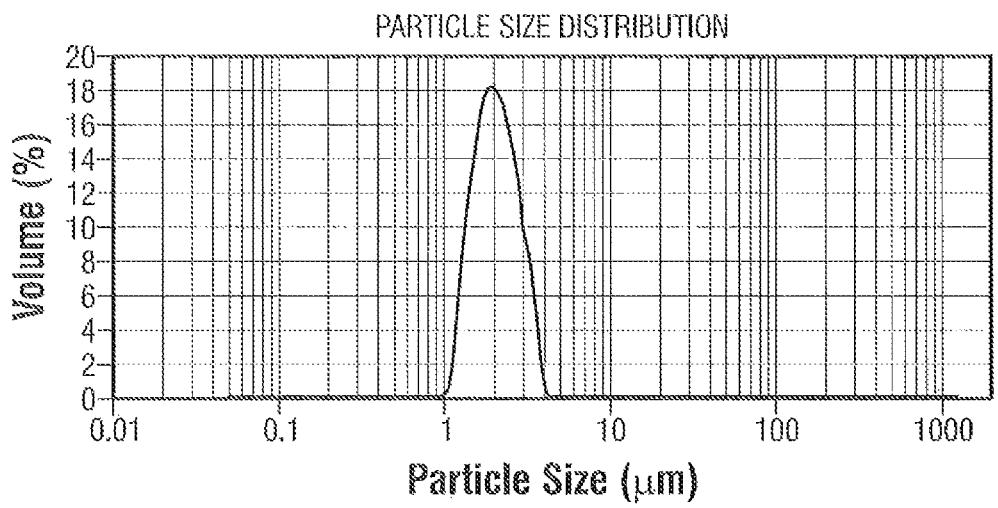

The Malvern output for incoming oil, FIG. 2 [17-3], and outgoing oil, FIG. 3 [17-2], demonstrates a bimodal distribution for the incoming oil where the smaller peak likely represents the droplets left in the oil during the production process, with most of the larger peak representing added water. This is supported by the water DSD of the oil prior to forming the emulsion, FIG. 4. The cutoff of the smaller peak is estimated at about 4 microns, the centrifuge removed some of the droplets present in the oil as received which shows a cutoff of approximately 14.1 microns. The large submicron peak in FIG. 3 is likely residual solids in the oil. Evidence of solids in the centrifuge bowl after the run were consistent with the solids particle size range, approximately 10 grams of solids were recovered from the bowl after the initial test. There was strapping vs time earlier in the run), one would only calculate a removal of 7.8 vol % water from the feed instead of the 9.65 vol % actually achieved. The feed rate drop as the run progressed can be explained by the drop in blend tank pressure, as internal pressure decreased from 34 psig to 21 psig over the course of the run. Reliable feed and production rates of a commercial scale unit will make the separation more consistent.

FIG. 3 demonstrates the water DSD of combined oil out samples after centrifugation. Submicron peaks (<1.0 μm) were eliminated from the results for clarity. The d(0.5) of 2.0 and the cutoff of 4.1 microns are both slightly higher than the values reported for the oil out samples shown above. This is likely due to conditions during the testing where steady state separation was not achieved, but still indicates quite good separation on average. The only oil that did not end up in Tank 8 was the eight gallons left in the blend tank as well as line fill not fed to the centrifuge during the experiment.

The oil was run back through the centrifuge to see if additional water could be separated. Oil from the product tank was transferred back to the blend tank and mixed with the remaining eight gallons plus line fill. Initial volume was 164 gallons at about 100° F. Table 1 shows the analytical results for the feed (2-1) as well as a product sample (2-2) and the combined oil in the product tank.

Figure 6:
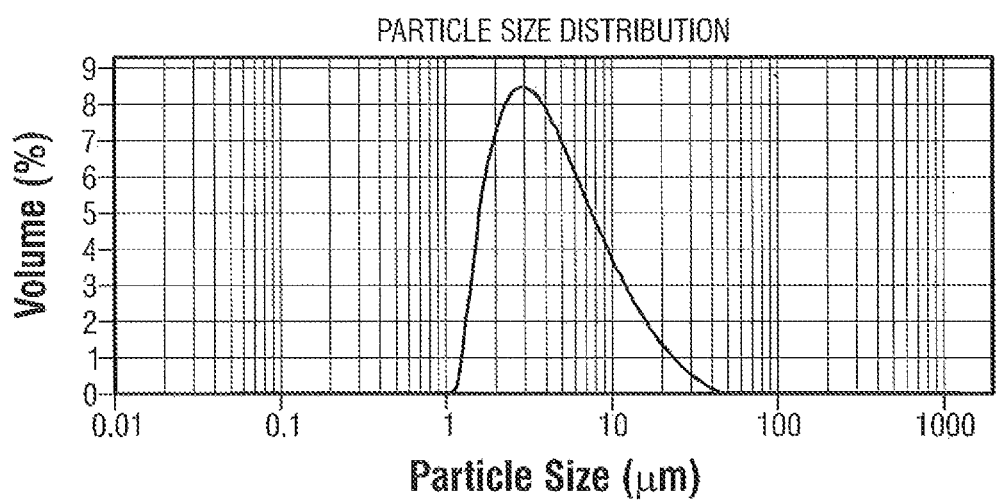
Figure 7:
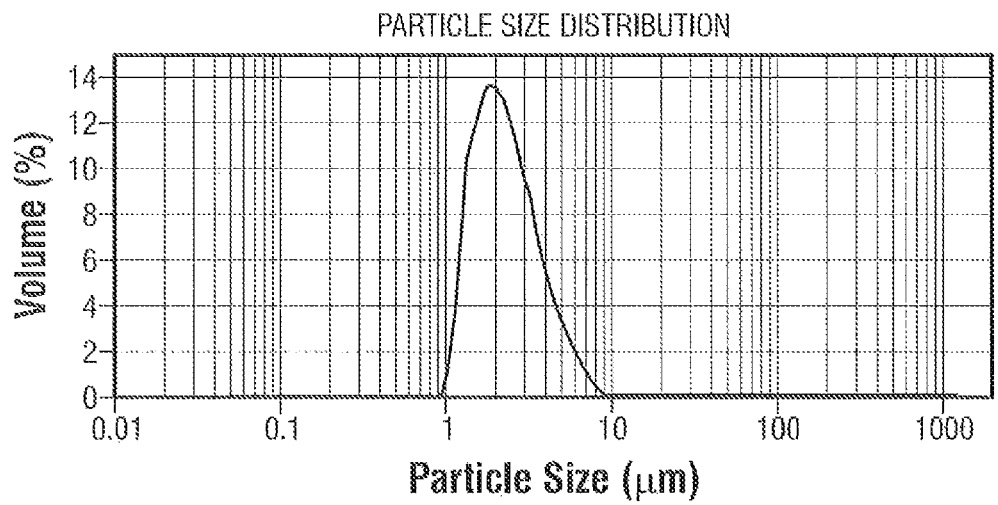
Figure 8:
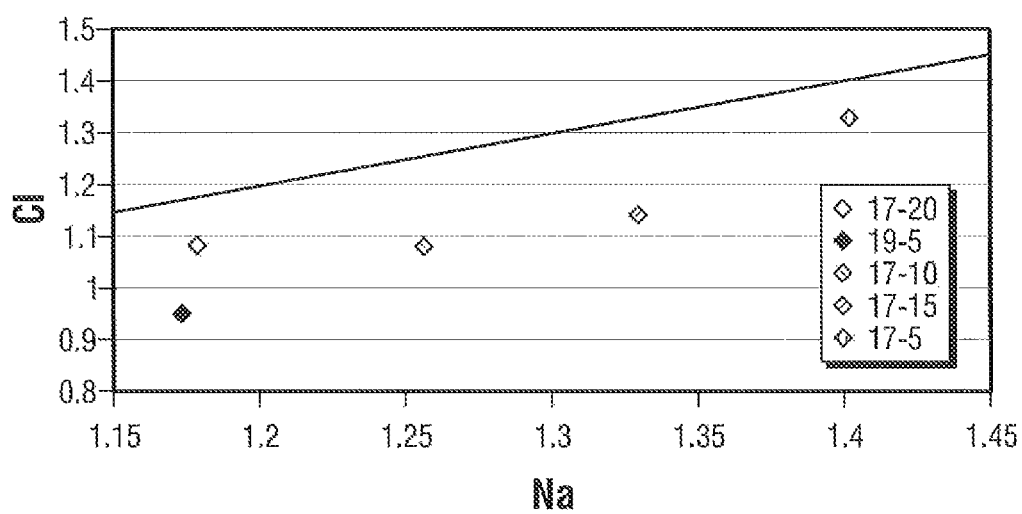

FIG. 6 shows the water DSD of the feed and FIG. 7 shows the water DSD of the product. A good water DSD measurement was not obtained for the second product, sample 2-2, but did get a good one on the combined product (1&2 combined). A cutoff diameter of 9.3 microns was determined for the combined sample while a cutoff diameter of 2.7 microns was determined for all of the product samples from the first run (1-2, 1-4, 1-6, & 1-8).

Three drums of desalted product from this experiment were stored for later use. A sample of 248 lb (approximately 32 gallons) of untreated oil recovered from the blend tank and piping was also stored.

Chloride extraction efficiency is determined from Na and Cl-contents of the separated waters corrected for the measured watercut (none of the impurities were assumed to come from the deionized water), and the mass concentration was divided by the appropriate molecular weight. FIG. 1H plots the results as Cl⁻ vs Na⁺. The line represents the ideal result if only NaCl were extracted from the crude oil. Note that all points are below this unity line indicating that salts and impurities other than NaCl were also removed.

The simulated rag layer was successfully separated into a brine waste water and a desalted and dewatered oil layer. The rag layer produced dewatered crude oil at a rate of ~3 gpm, far faster than achieved with a two-stage electrostatic desalter (data not shown). This work validates the concept and demonstrates the effectiveness of using stacked disk centrifuge technology to rapidly separate large volumes of emulsified crude oil rag layer for distillation and further pilot plant work.

Example 2

Pilot Scale Western Canadian Select Heavy Crude Oil Process

WCS crude oil blend had an API gravity very close to that of the MRH (20.4 API vs. 19.9 API). This report documents the successful desalting of 1,995 gallons of WCS crude oil blend to prepare it for fractionation and further pilot plant testing. As described above, desalting was accomplished using a blend tank with water and crude oil emulsion simulating a 'rag layer' fed to the stacked disk centrifuge system over the course of 5 operating days without the use of chemical additives. Chloride removal averaged 70 percent, ranging from 65 percent to 80 percent for the three composite product batches. Blend tank, emulsification pumps and a stacked disk centrifuge were used to effectively and economically desalt non-conventional crude oils without chemical addition.

Pilot scale equipment was used to generate batches of emulsion with deionized (DI) water and then to phase separate the water from the oil.

Emulsion Formation:

400 gallons of oil was transferred into a large volume blend tank at ambient temperature. Circulation was established from the bottom of the blend tank, through an emulsion pump and back into the top of the blend tank through a roll line. At the established circulation rate (indicated by flow through the emulsion pump and roll line), the average residence time of the oil in the blend tank was calculated. The total amount of water to be added to the oil was added over a period of time corresponding to this residence time, with the intent that the oil and water mixture only make one trip through the emulsion pump. DI water was added at a calculated rate and measured by an in-line flow gauge controlled using the valve on the DI water discharge line. Starting volume and target completion volumes were noted by the gauging marks on a polyethylene tank. When the correct amount of water had been added, the emulsion pump and DI water feed were shut down and blocked in. Final volume in the blend tank (calculated using the change in DI volume, change in crude oil volume, and tank strapping) was noted to confirm amount of water and crude oil added.

TABLE 2

Figure 9:
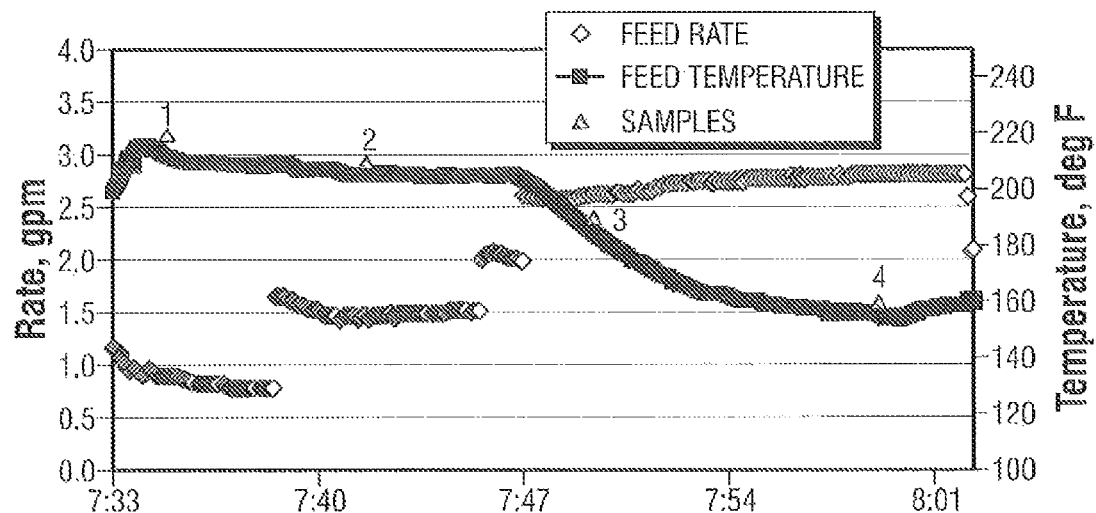
FIG. 9: WCS Desalting: Batch T2—The numbered triangles on this plot (and the others to follow) indicate the times when feed, dehydrated product, and separated water samples were taken around the centrifuge. These numbers correspond to the "WCSR Sample #" in the tables below. After the batch was complete, the oil samples were analyzed for watercut by HotSpin and for water DSD using the Malvern Mastersizer.
Figure 10:
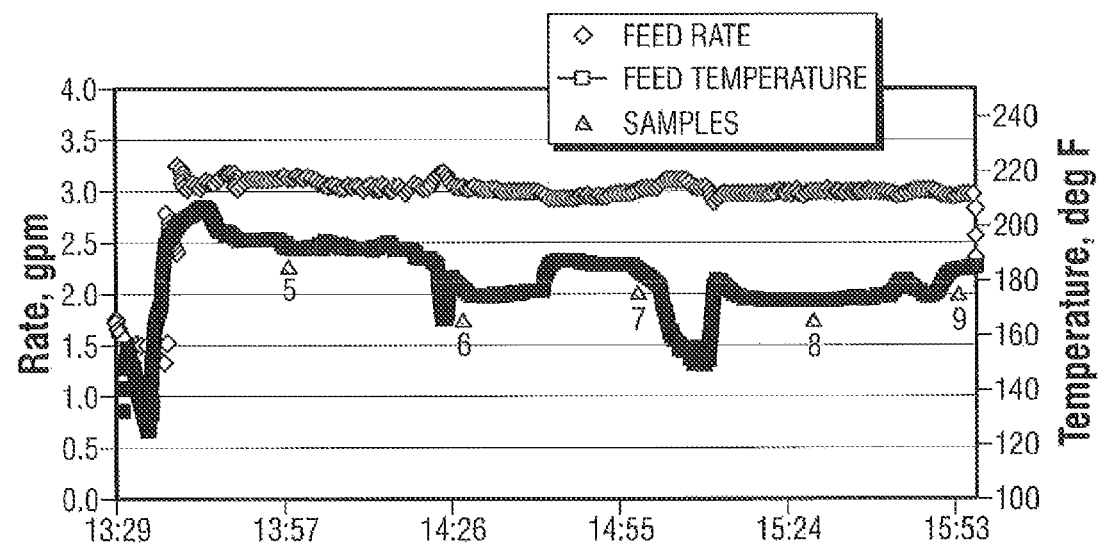
FIG. 10: WCS Desalting: Batch 1.
Figure 11:
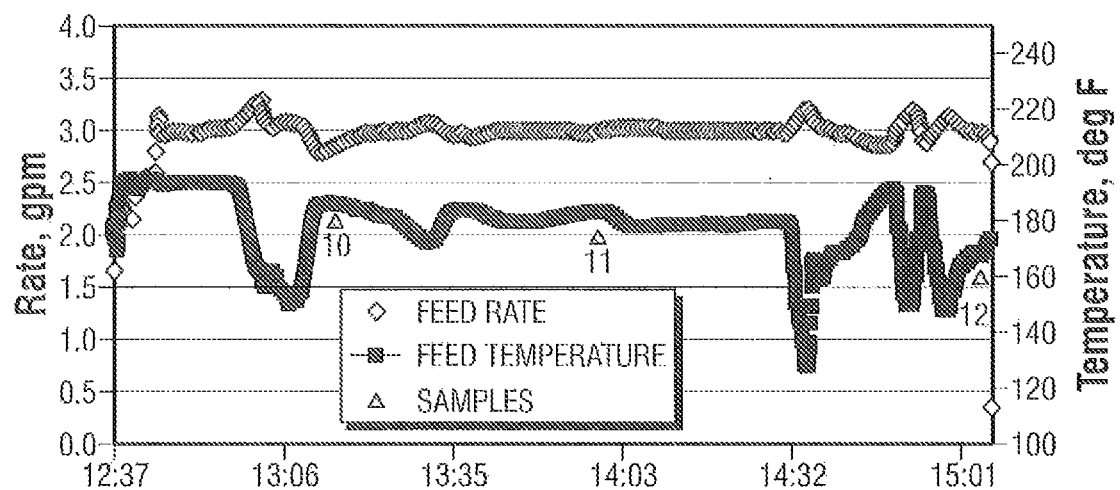
FIG. 11: WCS Desalting: Batch 2.
Figure 12:
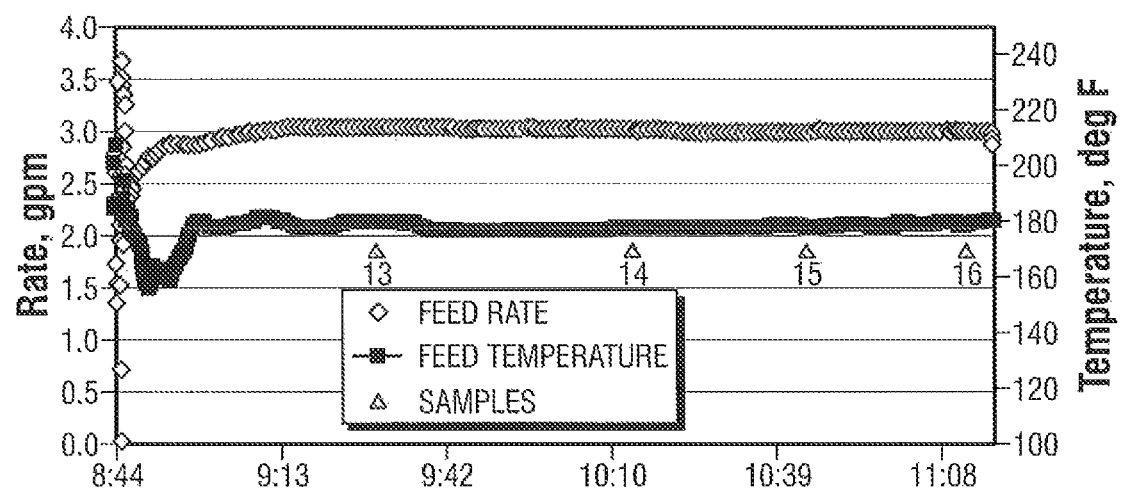
FIG. 12: WCS Desalting: Batch 3.
Figure 13:
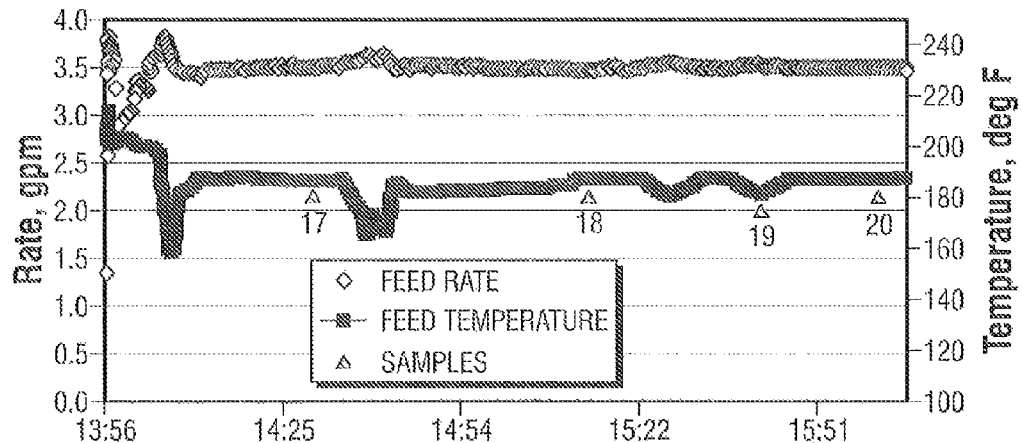
FIG. 13: WCS Desalting: Batch 4.
Figure 14:
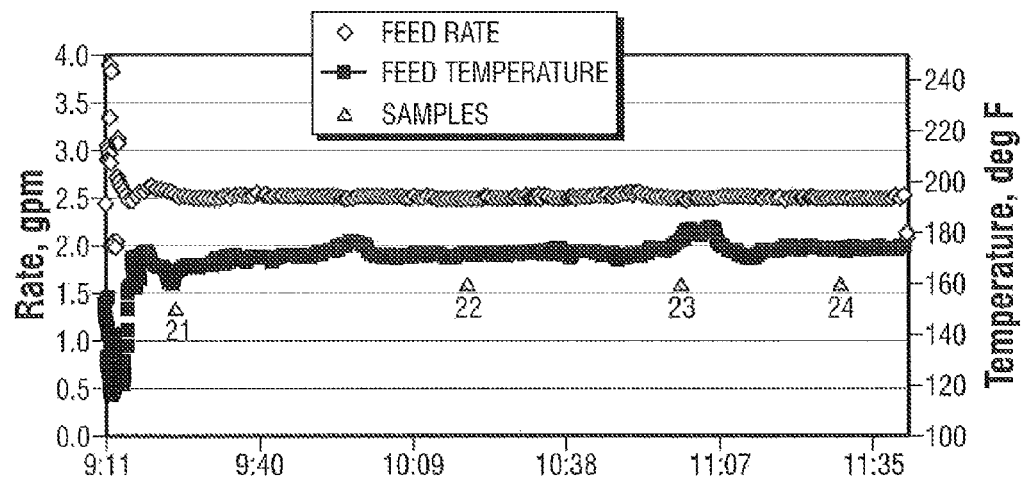
FIG. 14: WCS Desalting: Batch 5—Dehydration performed with conditions below.
Figure 15:
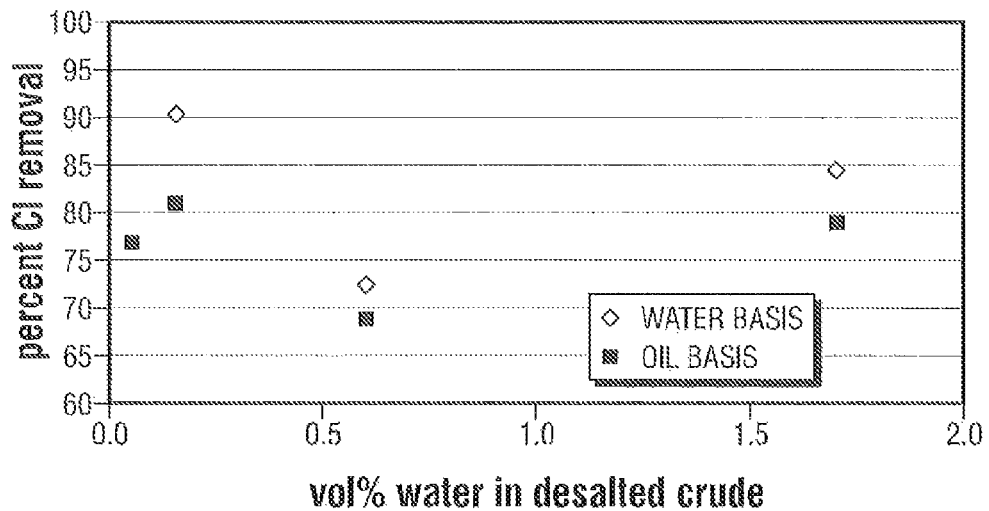
FIG. 15: Chloride Removal: WCS Desalting—Spot samples of chloride removal for data versus water
Figure 16:
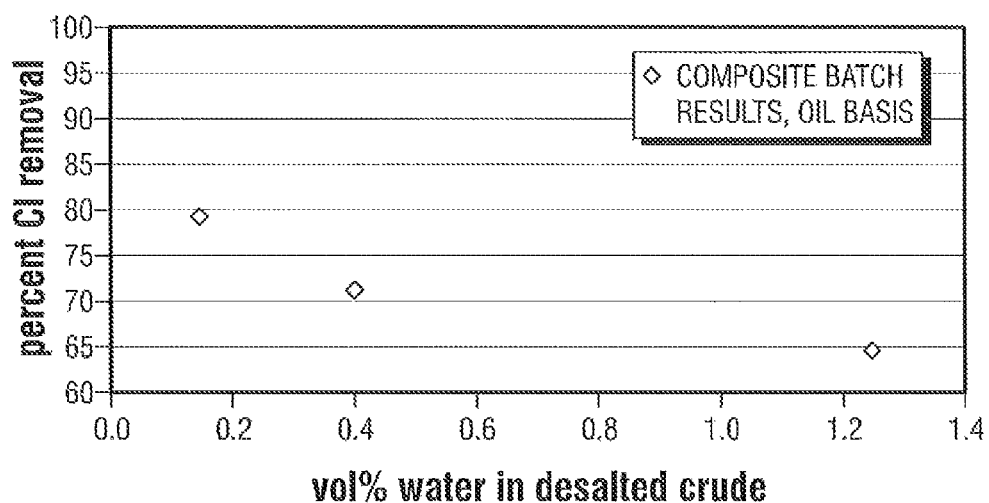
FIG. 16: Chloride Removal: WCS Desalting—chloride removal results from the three "lots" of desalted crude (batches T2 and 1, batches 2 and 3, and batches 4 and 5) do show correlation between removal and watercut.

| Batch | Feed Batches | | | | |
|---|---|---|---|---|---|
| | Volume (Gal) | Temp (° F.) | API VCF | Corrected Gal. | Weight (lbs) |
| T2 (FIG. 9) | 62.2 | 96 | 0.9857 | 61.3 | 477.0 |
| 1 (FIG. 10) | 396.7 | 97 | 0.9853 | 390.9 | 3041.2 |
| 2 (FIG. 11) | 402.8 | 87 | 0.9893 | 398.5 | 3100.5 |
| 3 (FIG. 12) | 394.4 | 87 | 0.9893 | 390.2 | 3035.8 |
| 4 (FIG. 13) | 394.0 | 89 | 0.9885 | 389.5 | 3030.3 |
| 5 (FIG. 14) | 345.2 | 91 | 0.9877 | 340.9 | 2652.5 |
| TOTAL FEED | | | | | 15337.3 |

Figure 17:
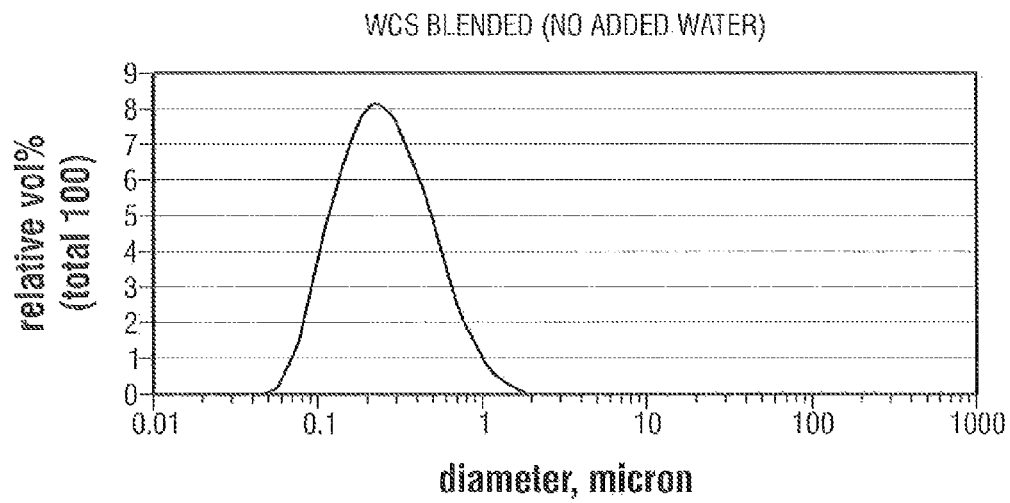
FIG. 17: WCS Blended (no added water)—Malvern output for a sample of WCS after blending in a blend tank. Water by distillation (run by A/S) on another aliquot of this material showed 0.00 vol %.
Figure 18:
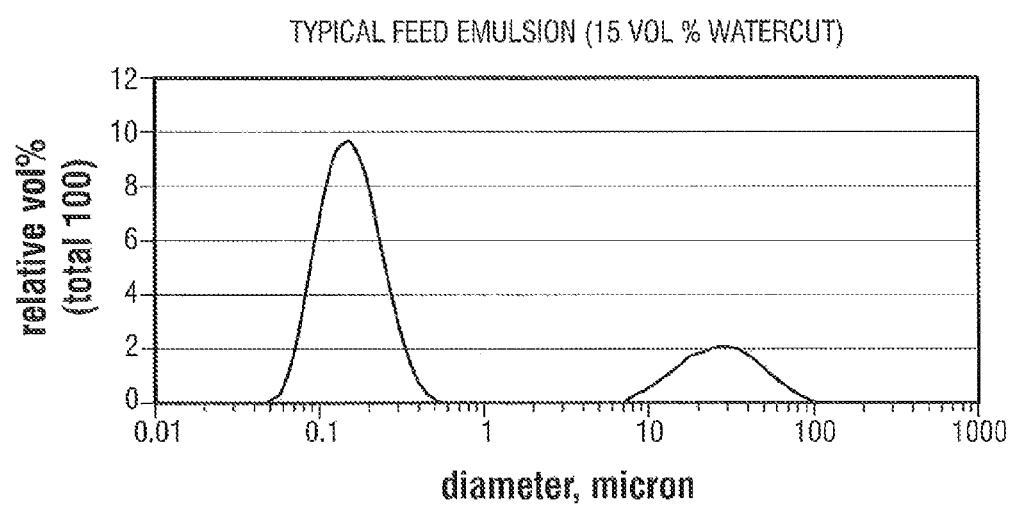
FIG. 18: Typical Feed Emulsion (15 vol % watercut)—analysis of a typical emulsion (Batch 5, 39801-18-1) is shown.
Figure 19:
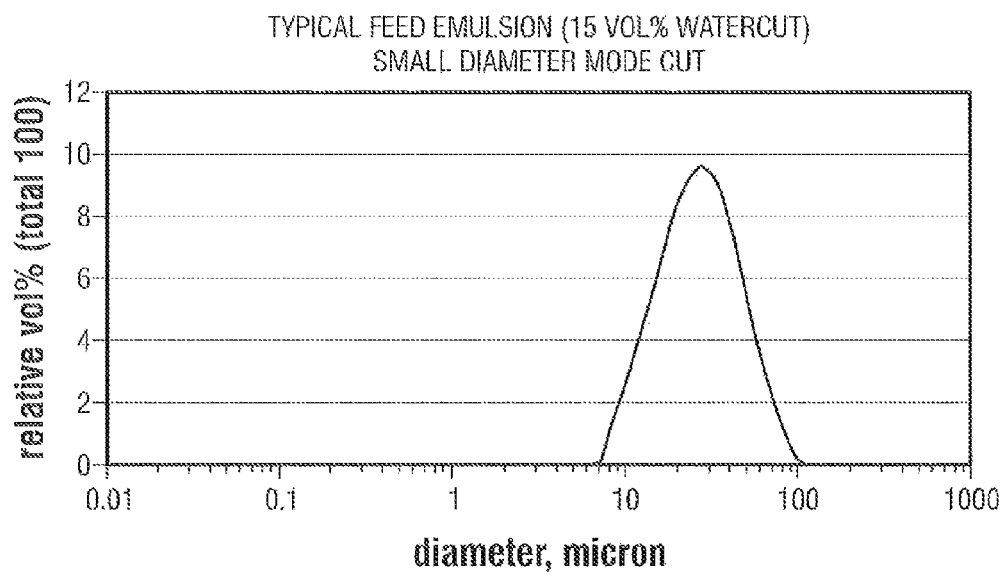
FIG. 19: Typical Feed Emulsion (15 vol % watercut) Small Diameter Mode Cut—smaller diameter mode is removed and the data renormalized to 100 vol %, the following plot is obtained.

The blend tank was allowed to go completely empty and the piping to the centrifuge was blown clear during Batch #5. Thus the 345.2 gallons shown in Batch #5 includes an estimated 12.6 gallons from the roll pump piping and the estimated 10.6 gallons in the feed piping. The DSD of the water added can generally be described as a log normal distribution with about half the volume of water in droplets smaller than 25 microns, 10% smaller than 11 microns, and only 10% of the water in droplets larger than 50 microns. FIG. 17 shows the distribution of small particles in the blended WCS without water (starting crude oil). After emulsification the submicron peak contains both small particles as seen above with water droplets making the submicron peak (<1 μm) larger than the oil emulsion peak between 10 and 100 microns (FIG. 18). Removing the submicron peak, displaying only the emulsion greater than 1 μm shows the emulsion is centered around ~25 microns with 10 vol % of the droplets in this distribution having less than 11 microns in diameter, and only 10% having greater than 50 micron diameter. The diameter below which 50 vol % of the water volume exists is approximately 25 microns (definition of d(0.1), d(0.9), and d(0.5), respectively).

Phase Separation:

Each batch of emulsion was phase-separated using a GEA Westfalia Separator ODA-7 stacked disk centrifuge bowl where separation occurs at a maximum ID of 252 mm and a rotational speed of 7,850 rpm. This means that acceleration at the periphery of the bowl is 8,700 times that of gravity. Separation of water droplets from the emulsion happens very quickly as a result. Nitrogen pressure on the blend tank was used to push emulsion to the centrifuge. Flow rate of emulsion was controlled using the nitrogen pressure valve, and temperature was controlled manually using the blend tank jacket flow and an inline heat exchange. Temperatures were measured by the blending tank thermometer and inline thermometers for various feeds. Flow rates were approximately 2.5 to 3.5 gpm, and centrifuge feed temperatures were generally held between 160° F. and 180° F. Phase separated water flow and quality were monitored through a sight glass during operation. Separated water was discharged to the 400-gallon wastewater tank. Dehydrated oil was pumped with the stacked disk centrifuge centripetal pump to a 100-gallon vessel. When the high alarm point on the oil storage vessel was reached the control system automatically pumped the contents to a 500-gallon capacity storage tank. The automatic pump was shut down when the 100-gallon vessel reached the low alarm point. This sequence continued through the course of a batch. When the blend tank volume reached zero (feed piping and pumps were not drained and remained filled with emulsion), system was closed, and all valving was configured to prepare the next batch of emulsion in the blend tank. The 500-gallon vessel contents were transferred to either drums or to one or more long term storage tanks Flex hoses were used to transfer oil from the 100-gallon vessel to the 500-gallon vessel during the course of running a batch, and the hoses were disconnected when other transfers were being made. Samples of centrifuge feed emulsion and dehydrated product were obtained at several points during each batch. Watercut was measured by the HotSpin method (as previously described) and DSD was measured using a dilute toluene dispersion of the samples in a Malvern Mastersizer 2000. Added water DSD is described above and was consistent through all samples analyzed. The cutoff diameter of the product water DSD (that diameter above which no water droplets were detected) varied between 2 and 6 microns, indicating that virtually all added water had been removed and that part of the native water had also been removed.

The 345.2 gallons in batch #5 includes an estimated 12.6 gallons from the roll pump piping and the estimated 10.6 gallons from the feed piping as the blend tank was allowed to go completely empty and the piping to the centrifuge was blown clear.

Extractable chloride content of sample #1 feed emulsion was 27.1 wppm and the product was 8.8 wppm. Extractable chloride content of sample #4 feed was 23.7 wppm and the product was 9.2 wppm. These are chloride removals of 71 percent and 65 percent respectively on a dry oil basis. The measurements of watercut in the products were essentially at the lower limit of what can be determined using the HotSpin method.

Figure 20:
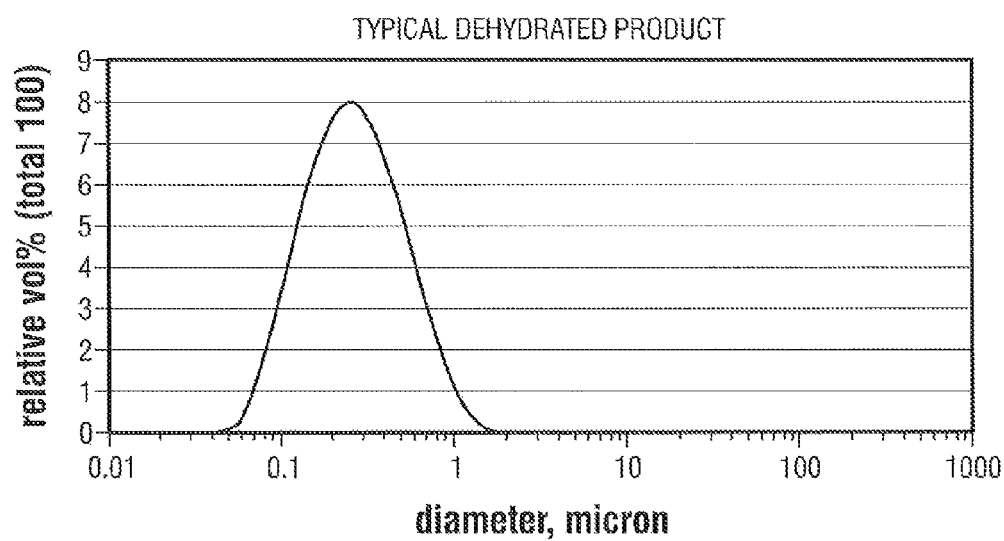
FIG. 20: Typical Dehydrated Product—Malvern results for a dehydrated product (39801-18-18). This sample was the last one taken (Sample #24) and the water content was determined to be 1.70 vol % by HotSpin. It looks very similar to the plot for the blended crude.
Figure 21:
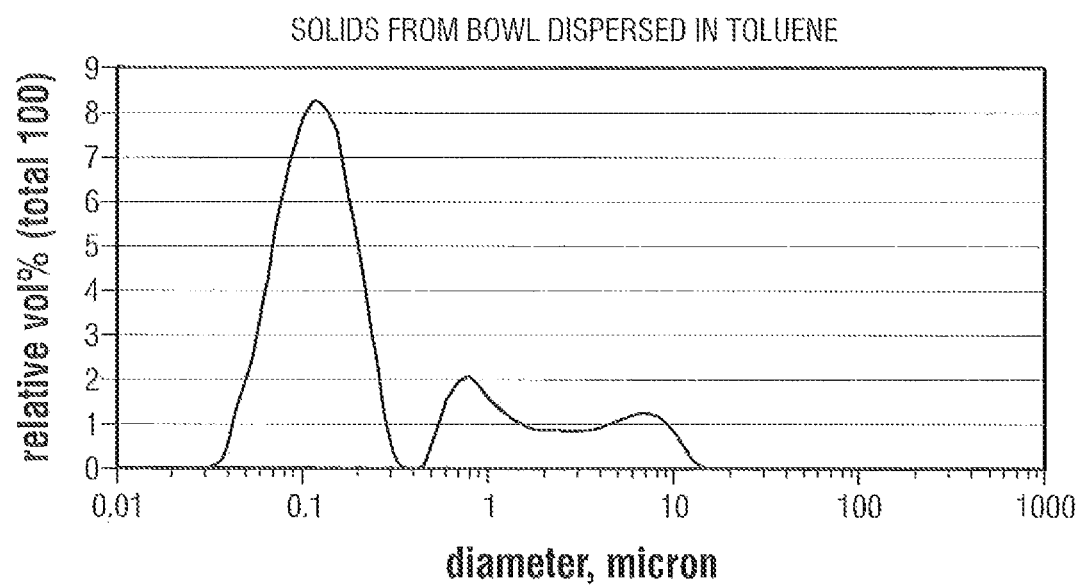
FIG. 21: Solids from Bowl Dispersed in Toluene.

A total of 1,995 gallons of WCS crude oil emulsion were separated into clean oil and brine waste water. Aliquots from feed crude oil emulsion as well as produced clean oil and waste water were sampled before during and after stacked disk centrifugation to assess emulsion separation and contaminant levels in the clean oil and waste water. Additionally, a representative aliquot from a separate supply was provided for a full heavy crude oil assay. Six emulsion batches were made and dewatered between during a 1 week period. The first batch was a small batch (designated "Batch T") used to test separation conditions to be used in the remaining batches. 12 gallons of DI water were emulsified into 100 gallons of oil. It was hoped that separation could be effected without heating the emulsion feed to the centrifuge. Several attempts to accomplish this were not successful. Approximately 50 gallons of feed emulsion were used in this attempt, 30 gallons of which ended up in 100 gallon vessel, and 20 gallons of which ended up in a wastewater tank. The 30 gallons in 100 gallon vessel were drummed out and put into the blend tank as part of the sixth and last batch. The desalted crude oil FIG. 20 was similar to the blended crude initially measured except that solids and water were removed from the dehydrated product.

TABLE 3

Pilot Scale Dehydration

| WCSR Sample | Batch | API | Feed Water (vol %) | Feed Cl- (wppm) | Product Water (vol %) | Product Cl- (wppm) | Cl- removed (%) | Water, Oil & Grease (wppm) | FIG. |
|---|---|---|---|---|---|---|---|---|---|
| 1 | T2 | 20.4 | 11.3 | 27.1 | 0.40 | 8.8 | 67.5 | | 9 |
| 2 | T2 | | 10.1 | | 0.20 | | | | 9 |
| 3 | T2 | | 9.4 | | 0.20 | | | | 9 |
| 4 | T2 | | 9.6 | 23.7 | 0.60 | 9.2 | 61.1 | 448 | 9 |
| 5 | 1 | 18.2 | 11.0 | | 0.13 | | | | 10 |
| 6 | 1 | | 10.6 | | 0.10 | | | | 10 |
| 7 | 1 | | 10.4 | | 0.05 | | 6.8 | | 10 |
| 8 | 1 | | — | | 0.05 | | | | 10 |
| 9 | 1 | | — | | 0.06 | | | 326 | 10 |
| 10 | 2 | 18.6 | — | | 0.05 | | | | 11 |
| 11 | 2 | | 11.6 | | 0.12 | | | | 11 |
| 12 | 2 | | — | | 0.07 | | | 174 | 11 |
| 13 | 3 | 18.6 | 13.5 | | 0.15 | | 5.6 | | 12 |
| 14 | 3 | | — | | 0.13 | | | | 12 |
| 15 | 3 | | — | | 0.20 | | | | 12 |
| 16 | 3 | | 13.5 | | 0.19 | | | 129 | 12 |
| 17 | 4 | 18.3 | — | | 0.26 | | | | 13 |
| 18 | 4 | | — | | 0.18 | | | | 13 |
| 19 | 4 | | 13.9 | | 0.53 | | | | 13 |
| 20 | 4 | | 13.9 | | 0.98 | | | 137 | 13 |
| 21 | 5 | 18.3 | 14.0 | | 0.66 | | | | 14 |
| 22 | 5 | | — | | 1.55 | | | | 14 |
| 23 | 5 | | 14.0 | | 1.65 | | | | 14 |
| 24 | 5 | | — | | 1.70 | | 6.3 | 213 | 14 |

By Analytical Services (A/S) on select water samples.

In total, about 2,000 gallons of WCS was effectively desalted (average 70% chloride removal in a single stage) over the course of 5 operating days, with 800 gallons being desalted during one of those days. Good water separation was seen during the conditions tested both in the small scale and pilot scale separations. This rag layer separation method has advantages over existing desalting methods, because maintaining a consistent rag layer allows increased production rate with decreased contaminants in the produced crude oil and waste water. Additionally, non-traditional crude oils with increased salt content, more solids, and lower APIs hinder traditional separation techniques, but can now be separated using a separation chamber and a stacked disk centrifuge. This decreases the amount of chemical treatment, heat treatment or other modifications to the emulsion and allows clean crude oil separation at higher rates.

Example 3

Commercial Scale Heavy Crude Oil Process

In one example, a commercial scale desalting system can have a separator tank with a clean crude outlet, wastewater outlet and rag layer outlet, the rag layer outlet feeds directly to a stacked disk centrifuge operating at a rate required to keep the rag layer height fairly constant preventing rag layer contamination of wastewater and oil feedstreams. The stacked disk centrifuge can separate the oil and water emulsion at a rate of greater than 3 gpm, sufficient to process the rag layer produced in a conventional refinery separator. If a greater processing capacity is required, additional stacked disk centrifuges or larger stacked disk centrifuges may be used to process the rag layer at a greater rate. If a higher level of separation is required, contaminants are still present in the clean crude oil, then additional stacked disk centrifuges may be used. Separated water may be fed into numerous water systems on the refinery including back into the separator, into a wastewater stream, and/or purified to recycle waste water. Clean crude oil is fed into the outgoing oil feedstream.

Using an open-nozzle centrifuge such as the Westfalia ODB-260, solids are removed continuously at centrifugation speeds through controlled nozzles along the circumference of the centrifuge. Higher levels of water and salt removal are achieved through consistent feed supplies and removal of solids during stacked disk centrifugation.

A continuous commercial desalter apparatus includes an incoming mixed heavy crude oil and water/brine feedstock feeding into a commercial grade separator with three or more outgoing streams including a crude oil stream, a waste water stream and a rag layer stream. The rag layer stream feeds into a stacked disk centrifuge with three or more output streams including desalted crude oil, a wastewater and solids. The desalted crude oil product is sufficient for additional refining and may feed directly into the separator crude oil stream or other crude oil stream. The wastewater stream may be fed back into the separator aqueous layer, as a feed for the water/brine, or into a wastewater stream, or be purified, de-ionized or recycled. Because this process can reduce the amount of emulsion breakers or other added chemicals required, the costs of desalting are dramatically reduced. Additionally, this system allows the convention separator to run at a much higher rate, by maintaining a fairly constant rag layer thickness water contamination of the outgoing crude oil stream and oil contamination of the outgoing wastewater are minimized. The difficult to separate rag layer is no longer rate limiting for the separator and the rag layer can be removed and separated at a much higher flow rate in the stacked disk centrifuge. This system produces consistent results desalting a variety of non-conventional heavy crude oils and high salt crude oils. Previous methods were unable to desalt non-conventional crudes due to low API, high viscosity, high salt content, and the rate of production would be slowed by rag layer contamination of products.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication date after the priority date of this application. Incorporated references are listed again here for convenience:
1. U.S. Pat. No. 4,415,434, "Multiple stage desalting and dedusting process," Standard Oil, Hargreaves and Hensley (1983).
2. U.S. Pat. No. 4,473,461, "Centrifugal drying and dedusting process," Standard Oil, Thacker and Miller (1984).
3. U.S. Pat. No. 4,938,876, WO9009833, "Method for separating oil and water emulsions," Dr. Ernest O. Ohsol, (1990).
4. U.S. Pat. No. 5,219,471, "Removal of metals and water-insoluble materials from desalter emulsions," Amoco Corp., Goyal, et al. (1993).
5. U.S. Pat. No. 5,738,762, "Separating oil and water from emulsions containing toxic light ends," Dr. Ernest O. Ohsol, (1998).
6. U.S. Pat. No. 5,882,506, WO9925795, "Process for recovering high quality oil from refinery waste emulsions," Uni-Pure Corp., Ohsol, et al. (1999).
7. U.S. Pat. No. 5,948,242, WO9919425, "Process for upgrading heavy crude oil production," UniPure Corp., Ohsol, et al. (1999).
8. U.S. Pat. No. 7,612,117, US20070111903, US2007112079, WO2007061722, "Separatory and emulsion breaking processes," Gen. Electric, Engel, et al. (2007).
9. Araujo, et al., "Evaluation of Water Content and Average Droplet Size in Water-in-Crude Oil Emulsions by Means of Near-Infrared Spectroscopy," Energy Fuels, 22:3450-8 (2008).
10. Kraiwattanawong, et al., "Effect of Asphaltene Dispersants on Aggregate Size Distribution and Growth," Energy Fuels, 23:1575-82 (2009).
11. Zaki, et al. "A Novel Process for Demulsification of Water-in-Crude Oil Emulsions by Dense Carbon Dioxide," Ind. Eng. Chem. Res. 2003, 42, 6661-6672
12. Nnanna, et al., "Emerging Technologies and Approaches to Minimize Discharges into Lake Michigan," Purdue University Calumet Water Institute—Argonne National Laboratory Task force, (2008)
13. ASTM D6470-99 Standard Test Method for Salt in Crude Oils (Potentiometric Method)

14. ASTM D6470-99 (2004) Standard Test Method for Salt in Crude Oils (Potentiometric Method)
15. ASTM D3230-09 Standard Test Method for Salts in Crude Oil (Electrometric Method)

The invention claimed is:

1. A method of reducing a crude oil emulsion rag layer comprising:
   a) separating an oil and water feedstream in a separator into at least three outgoing streams including an outgoing crude oil stream, an outgoing wastewater stream and an outgoing rag layer stream, wherein the rag layer is an emulsion formed between the crude oil and water;
   b) removing said outgoing rag layer stream from said separator;
   c) centrifuging the rag layer stream from the separator in a disk stack centrifuge and separating the rag layer stream into at least three separate streams including an outgoing crude oil stream, an outgoing wastewater stream and an outgoing solids rich stream;
   d) removing a crude oil stream from the separator and the disk stack centrifuge; and
   e) removing a wastewater stream from the separator and the disk stack centrifuge.

2. The method of claim 1, wherein said separating step (a) additionally comprises separating the oil and water feedstream with a separator selected from the group consisting of one or more low pressure separators, high pressure separators, 2 phase separators, electrostatic coalescence separators, AC deep-field electrostatic separators, dual frequency separators, dual polarity combination AC/DC electrostatic separators, 3 phase separators, high velocity electrostatic coalescing separators, vessel internal electrostatic coalescers, and combinations thereof.

3. The method of claim 1, wherein said centrifuging step (c) additionally comprises centrifugally separating the rag layer steam with a disk stack centrifuge is selected from the group consisting of nozzle separators, self-cleaning disk separators, solid-wall separators, and the like which contain a stack of conical disks either with or without chambers to collect a variety of materials separated using centrifugal forces.

4. The method of claim 1, wherein said method further comprises heating said crude oil emulsion to a temperature between approximately 140° F. and 300° F., prior to said centrifuging step (c) in the stacked disk centrifuge.

5. The method of claim 1, wherein said crude oil in the oil and water feedstream is selected from the group consisting of Athabasca oil sands (crude bitumen), Orinoco oil sands (extra heavy oil), Canadian Extra Heavy Oil (CXHO), Western Canadian Select (WCS), MacKay River Heavy (MRH), oil shales, crude bitumens, extra heavy oils, oilsands, tarsands, sour crudes, and mixtures thereof.

6. The method of claim 1, wherein said water in the oil and water feedstream is selected from the group consisting of tap water, de-ionized (DI) water, recycled water, distilled water, chilled water, heated water, ultra-purified water, clarified water, and mixtures thereof.

7. The method of claim 1, wherein the rag layer formed in the separator in separating step (a) includes particles and wherein the particle size distribution is approximately 1 to 20 μm.

* * * * *